United States Patent
Wan et al.

(10) Patent No.: US 11,411,737 B2
(45) Date of Patent: Aug. 9, 2022

(54) ZERO KNOWLEDGE PROOF-BASED PRIVACY PROTECTION METHOD AND SYSTEM FOR AUTHENTICATED DATA IN SMART CONTRACT

(71) Applicant: SHANDONG UNIVERSITY, Shandong (CN)

(72) Inventors: Zhiguo Wan, Qingdao (CN); Zhangshuang Guan, Qingdao (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 17/057,758

(22) PCT Filed: Nov. 19, 2019

(86) PCT No.: PCT/CN2019/119520
§ 371 (c)(1),
(2) Date: Nov. 23, 2020

(87) PCT Pub. No.: WO2020/114240
PCT Pub. Date: Jun. 11, 2020

(65) Prior Publication Data
US 2021/0297255 A1    Sep. 23, 2021

(30) Foreign Application Priority Data
Dec. 6, 2018  (CN) .......................... 201811487845.2

(51) Int. Cl.
*H04L 9/32* (2006.01)
*H04L 9/14* (2006.01)
*H04L 9/40* (2022.01)

(52) U.S. Cl.
CPC .............. *H04L 9/3218* (2013.01); *H04L 9/14* (2013.01); *H04L 63/061* (2013.01)

(58) Field of Classification Search
CPC ........ H04L 9/3218; H04L 9/14; H04L 63/061; H04L 2209/38; H04L 9/3239;
(Continued)

(56) References Cited

U.S. PATENT DOCUMENTS

2012/0089494 A1* 4/2012 Danezis ................ H04L 9/3218
                                                      705/40
2017/0091750 A1* 3/2017 Maim ........................ H04L 9/14
(Continued)

FOREIGN PATENT DOCUMENTS

CN    103493428 A  *  1/2014  .......... H04L 9/0838
CN    108418689 A      8/2018
(Continued)

OTHER PUBLICATIONS

Feb. 24, 2020 Search Report issued in International Patent Application No. PCT/CN2019/119520.

*Primary Examiner* — Farid Homayounmehr
*Assistant Examiner* — Sanchit K Sarker
(74) *Attorney, Agent, or Firm* — Oliff PLC

(57) ABSTRACT

A Zero Knowledge Proof (ZKP)-based privacy protection method and system for authenticated data in a smart contract wherein initialization is performed. Inputting a security parameter obtains a public parameter. A Data Authenticator (DA) generates a public/private key pair. A key pair is generated using the public parameter and a verification circuit as inputs, the key pair including a proof and a verification key. Authentication on private data of a Decentralized App (DApp) User (DU) is performed using the private key of the DA, and generates a signature. A DU prover terminal inputs private data as an input value and a calculation result and hash value as output values. The DU generates a ZKP using the proof key. A validator verifies whether the ZKP is correct. If verification passes, the calculation result is correct; otherwise the calculation result (Continued)

is wrong. The validator executes a smart contract based on the verification result.

8 Claims, 3 Drawing Sheets

(58) Field of Classification Search
CPC . H04L 9/3247; H04L 63/0442; H04L 63/062; H04L 63/126; G06F 21/602; G06F 21/6245; G06F 21/64
USPC .......................................................... 713/171
See application file for complete search history.

(56) References Cited

U.S. PATENT DOCUMENTS

| | | | |
|---|---|---|---|
| 2019/0280880 A1* | 9/2019 | Zhang | ................... G06N 7/005 |
| 2020/0007318 A1* | 1/2020 | Camenisch | ........... H04L 9/3218 |

FOREIGN PATENT DOCUMENTS

| | | | |
|---|---|---|---|
| CN | 108418783 A | 8/2018 | |
| CN | 108898490 A | 11/2018 | |
| CN | 109614820 A | 4/2019 | |

\* cited by examiner

ZERO KNOWLEDGE PROOF-BASED PRIVACY PROTECTION METHOD AND SYSTEM FOR AUTHENTICATED DATA IN SMART CONTRACT

BACKGROUND

Technical Field

The present disclosure relates to the technical field of blockchains, and more particularly, to a Zero Knowledge Proof (ZKP)-based privacy protection method and system for authenticated data in a smart contract.

Related Art

The statements in this section merely provide background techniques related to the present disclosure, and do not necessarily constitute the prior art.

With the unprecedented success of the cryptocurrency Bitcoin, the rapid development of the blockchain technology has led a new technological wave in the Internet field. As a distributed system without a central server, a blockchain does not rely on the correct execution of any party. Once recorded on the blockchain, data cannot be changed. The tamper-proof nature of the blockchain ensures the integrity of transactions thereon, thus establishing a trust relationship.

A smart contract is a program running on the blockchain, and its execution must be verified by consensus. The emergence of the smart contract enables the blockchain to handle more complex logic than fund transfers. The combination of the blockchain technology and the smart contract has been applied in many fields such as finance, insurance, notary, real estate, lottery, voting, supply chains, smart grids, medical insurance, Internet of Things, cloud computing and the like.

When the blockchain is applied to actual scenarios to realize the automatic execution of the smart contract, interaction with the real world is inevitable. The smart contract on the blockchain needs to acquire certain information from the real world as inputs, so as to calculate a result and execute it in accordance with predetermined rules. However, not all the inputs from the real world to the smart contract can be open to the public. For example, the smart contract of medical insurance requires age, occupation, gender and a physical examination report of an insured as inputs. For the protection of privacy, the data cannot be open to the public. On the other hand, even if medical insurance is maintained using a consortium blockchain and an access control mechanism is adopted to prevent privacy leakage, personal medical information will still be leaked to nodes that maintain the consortium blockchain. Therefore, it is of great importance to provide authenticated real data to the smart contract on the blockchain without revealing any privacy so as to ensure the privacy and authenticity of data sent to the blockchain.

A ZKP refers to a method by which a prover who knows or possesses a certain message can convince a validator that a certain assertion is correct without providing any useful information to the validator. A lot of facts have proved that if the ZKP can be used for data authentication, many problems will be effectively solved. Correspondingly, the latest technologies for the ZKP include zk-SNARKs (zero-knowledge Succinct Non-interactive ARguments of Knowledge), zk-STARKs (zero-knowledge Scalable Transparent ARguments of Knowledge), Bulletproofs and the like. zk-SNARK has been successfully applied to the anonymous digital currency ZeroCash.

A digital signature is a combination of a public key encryption technology and a digital digest technology. The digital signature is equivalent to a traditional handwritten signature in many respects, and already has legal significance in some countries. A correctly implemented digital signature is more difficult to forge than a handwritten one. In addition, some undeniable digital signature schemes can provide a timestamp, which can ensure the validity of the signature even if the private key is leaked.

SUMMARY

In order to overcome the shortcomings of the prior art, the present disclosure provides a ZKP-based privacy protection method for authenticated data in a smart contract, which can ensure the privacy and authenticity of input data and allows everyone to verify the authenticity of the data without leaking sensitive information.

According to a first aspect, the present disclosure provides a ZKP-based privacy protection method for authenticated data in a smart contract.

The ZKP-based privacy protection method for authenticated data in a smart contract includes:

initialization step: performing initialization, including inputting a security parameter to obtain a public parameter, and generating, by a trusted Data Authenticator (DA), a public/private key pair;

key pair generation step: generating a key pair by using the public parameter and a verification circuit as inputs, the key pair including a proof key and a verification key;

data authentication step: performing authentication on private data of a Decentralized App (DApp) User (DU) by using the private key of the trusted DA, and generating a signature;

proof generation step: inputting, by a DU prover terminal, the private data serving as an input value and a calculation result and a hash value serving as output values of the verification circuit, and generating, by the DU, a ZKP using the proof key; and proof verification step: verifying, by a validator by using the verification key, whether the ZKP is correct or not, and determining that the calculation result is correct if the verification is passed, or determining that the calculation result is wrong if the verification fails; and executing, by the validator, a smart contract based on a result of the verification.

Further, the inputting a security parameter to obtain a public parameter specifically comprises: inputting the security parameter to obtain the public parameter using a ZKP system.

Further, the security parameter is an integer $\lambda$.

Further, the obtaining a public parameter using a ZKP system comprises: obtaining a public parameter pp using ZKP.Setup($1^\lambda$) of the ZKP system.

Further, the generating, by a trusted DA, a public/private key pair comprises: selecting, by the trusted DA, a digital signature mechanism to generate the public/private key pair, and announcing, by the trusted DA, the public key.

Further, the generating, by a trusted DA, a public/private key pair comprises: selecting, by the trusted DA, a digital signature mechanism $\pi$=(KeyGen, Sign, Verify), and running $\pi$.KeyGen to generate a public/private key pair ($pk_a$, $sk_a$).

Further, the announcing, by the trusted DA, the public key comprises: announcing, by the trusted DA, (pp, $pk_a$).

A plurality of trusted DAs are allowed, that is, private data of a user is authenticated by different DAs, and each DA generates a signature.

Further, in the generation of a key pair by using the public parameter and a verification circuit as inputs, the verification circuit specifically comprises:

a condition that the private data of the user needs to satisfy, for example, a given insurance condition that private information such as the health status and income of the user needs to satisfy.

Further, the generation of a key pair by using the public parameter and a verification circuit as inputs specifically comprises:

running a ZKP system by using the public parameter and the verification circuit as inputs to generate the key pair.

Further, the generation of a key pair by using the public parameter and a verification circuit as inputs is implemented by a trusted third-party institution or by a trusted process. The trusted third-party institution includes but is not limited to a digital certificate authority, a government department and the like.

The public parameter and the verification circuit are used as inputs, and a ZKP system is run to generate a key pair. The key pair is allowed to be generated jointly by a plurality of trusted institutions or generated by a trusted process.

Further, the generation of a key pair by using the public parameter and a verification circuit as inputs specifically comprises:

running a ZKP.KeyGen(pp, C) algorithm of a ZKP system by using a public parameter pp and a verification circuit C as inputs to generate a key pair (pk, vk), where the proof key pk is used for generating a proof, and the verification key vk is used for verifying the proof.

Further, the performing authentication on private data of a DU by using the private key of the trusted DA and generating a signature comprises:

running, by the trusted DA, a DataAuth($sk_a$, $\vec{x}$) algorithm by using private data $\vec{x}$ and a signature private key $sk_a$ as inputs, to perform authentication, and generate a signature $\sigma_a$.

Further, the inputting, by a DU prover terminal, the private data serving as an input value and a calculation result and a hash value serving as output values of the verification circuit comprises:

inputting, by the DU prover terminal, the private data $\vec{x}$ serving as an input value and a calculation result R and a hash value h serving as output values of the verification circuit C.

Further, the generating, by the DU, a proof comprises: executing, by the DU, a ZKP system to generate the proof.

Further, the generating, by the DU, a proof comprises: executing, by the DU, a ZKP.Prove (pk, $\vec{x}$, R, h) algorithm of the ZKP system to generate a proof π.

Further, the verifying, by a validator by using the verification key, whether the ZKP is correct or not, and determining that the calculation result is correct if the verification is passed, or determining that the calculation result is wrong if the verification fails includes:

running, by a validator V, a Verify(vk, $pk_a$, π, R, h, $\sigma_a$) algorithm to verify whether the proof π is correct or not, and if the verification is passed, determining that the calculation result R is correct, or otherwise determining that the calculation result R is wrong.

According to a second aspect, the present disclosure provides a ZKP-based privacy protection system for authenticated data in a smart contract.

The ZKP-based privacy protection system for authenticated data in a smart contract includes:

an initialization module, configured to input a security parameter for initialization to obtain a public parameter, and generate a public/private key pair by a trusted DA;

a key pair generation module, configured to generate a key pair by using the public parameter and a verification circuit as inputs, the key pair including a proof key and a verification key;

a data authentication module, configured to perform authentication on private data of a DU by using the private key of the trusted DA, and generate a signature;

a proof generation module, configured to input, by a DU prover terminal, the private data serving as an input value and a calculation result and a hash value serving as output values of the verification circuit, and generate, by the DU, a ZKP using the proof key; and a proof verification module, configured to verify, by a validator by using the verification key, whether the ZKP is correct or not, and determine that the calculation result is correct if the verification is passed, or determine that the calculation result is wrong if the verification fails; and execute, by the validator, a smart contract based on a result of the verification.

Further, in the initialization module of the system, the trusted DA constructs the verification circuit based on the calculation task required by a smart contract-based DApp.

According to a third aspect, the present disclosure also provides an electronic device, which includes a memory, a processor, and computer instructions stored on the memory and executable by the processor. When run by the processor, the computer instructions implement the steps of the method according to the first aspect.

According to a fourth aspect, the present disclosure also provides a computer-readable storage medium configured to store computer instructions. When run by a processor, the computer instructions implement the steps of the method according to the first aspect.

Compared with the prior art, the beneficial effects of the present disclosure are as follows:

1. The technology proposed in the present disclosure ensures the authenticity and privacy of data in a smart contract, and does not leak input data to others, thereby ensuring the authenticity and validity of the input data.

2. The present disclosure can be applied to various blockchain systems to ensure the authenticity and privacy of data.

3. In the present disclosure, a proof generated by a user of a service provider is recorded by a blockchain, and any validator can access and verify the proof, thereby achieving real decentralization.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

DETAILED DESCRIPTION

It should be noted that, the following detailed descriptions are exemplary, and are intended to provide a further description to this application. Unless otherwise specified, all technical and scientific terms used herein have the same meaning as commonly understood by those of ordinary skill in the art to which this application belongs.

It should be noted that terms used herein are only for the purpose of describing specific implementations and are not intended to limit the exemplary implementations of this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Explanation of Terms:

Zero Knowledge Proof (ZKP);

Transaction (Tx): Similar to a transfer transaction of a digital currency in Bitcoin. One block contains a plurality of transactions. A miner runs a consensus algorithm to add a block to a blockchain.

In Embodiment 1, the present embodiment provides a ZKP-based privacy protection method for authenticated data in a smart contract.

Figure 1:
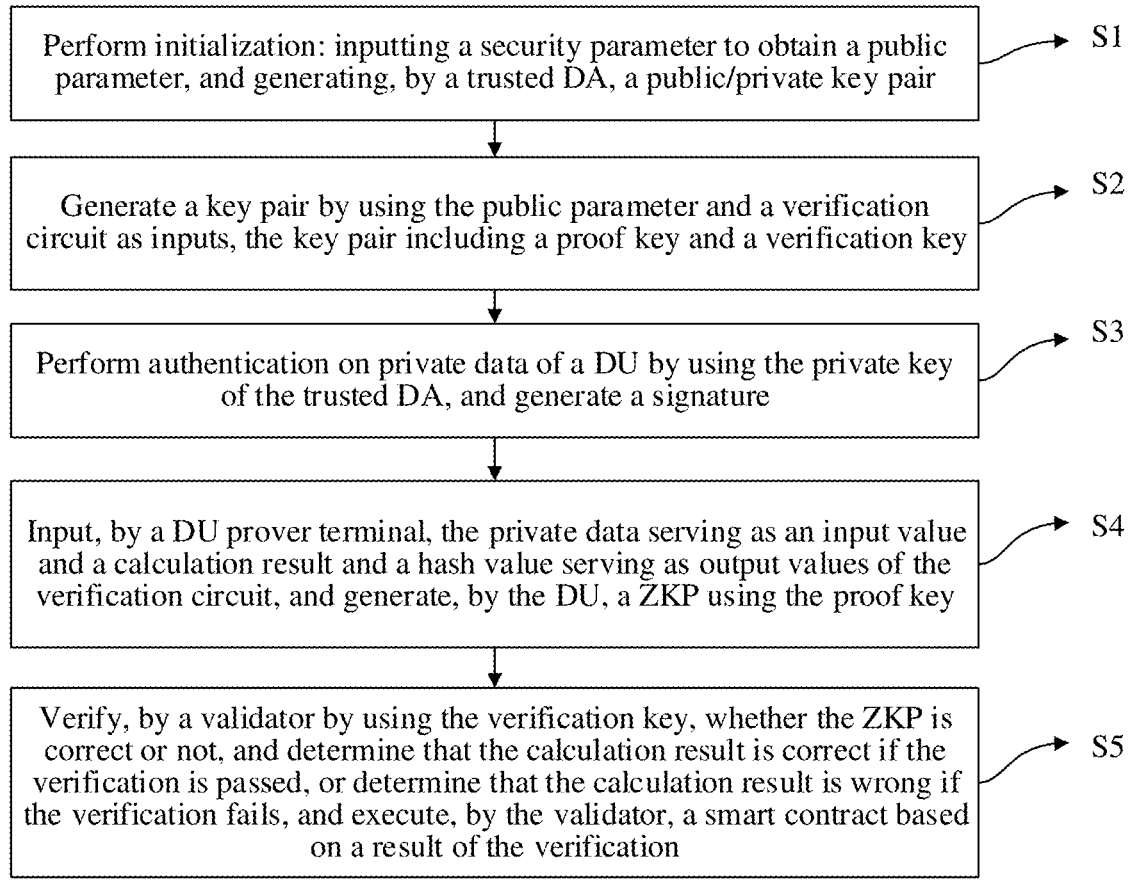
FIG. 1 is a flowchart of a method in Embodiment 1.

As shown in FIG. 1, the ZKP-based privacy protection method for authenticated data in a smart contract includes:

initialization step: a security parameter is input for initialization to obtain a public parameter, and a public/private key pair is generated by a trusted DA;

key pair generation step: a key pair is generated by using the public parameter and a verification circuit as inputs, and the key pair includes a proof key and a verification key;

data authentication step: authentication on private data of a DU is performed by using the private key of the trusted DA, and a signature is generated;

proof generation step: the private data serving as an input value of the verification circuit and a calculation result and a hash value serving as output values of the verification circuit are input into the verification circuit by a DU prover terminal, and a ZKP is generated by the DU using the proof key; and proof verification step: whether the ZKP is correct or not is verified by a validator by using the verification key; if the verification is passed, it is determined that the calculation result is correct, or otherwise it is determined that the calculation result is wrong; and a smart contract is executed by the validator based on a result of the verification.

Specifically, the ZKP-based privacy protection method for authenticated data in a smart contract includes the following steps.

A trusted DA, a DU, a validator V, and a smart contract-based DApp are adopted.

Step (1): initialization: a security parameter $\lambda$ is input for initialization, and a public parameter pp is obtained using ZKP.Setup($1^\lambda$) of a ZKP system.

The trusted DA selects a digital signature mechanism $\pi$=(KeyGen, Sign, Verify), and runs $\pi$.KeyGen to generate a public/private key pair ($pk_a$, $sk_a$).

The trusted DA announces (pp, $pk_a$).

Step (2): key pair generation: a ZKP.KeyGen(pp, C) algorithm of the ZKP system is run by using the public parameter pp and a verification circuit C as inputs to generate a key pair (pk, vk). The proof key pk is used for generating a proof, and the verification key vk is used for verifying the proof.

Step (3): data authentication: the trusted DA runs a DataAuth($sk_a$, $\vec{x}$) algorithm by using private data $\vec{x}$ and a signature private key $sk_a$ as inputs, performs authentication on the data, and generates a signature $\sigma_a$.

Step (4): proof generation: a DU prover terminal inputs the private data $\vec{x}$ serving as an input value and a calculation result R and a hash value h serving as output values of the verification circuit C. The DU executes a ZKP.Prove(pk, $\vec{x}$, R, h) algorithm of the ZKP system to generate a proof $\pi$.

Step (5): proof verification: the validator V runs a Verify (vk, $pk_a$, $\pi$, R, h, $\sigma_a$) algorithm, and verifies whether the proof $\pi$ is correct or not; if the verification is passed, it is determined that the calculation result R is correct, or otherwise it is determined that the calculation result R is wrong.

As some possible implementations, the ZKP system in step (1) includes:

ZKP=(Setup, KeyGen, Prove, Verify) is but not limited to zk-SNARKs, zk-STARKs, and Bulletproofs.

ZKP.Setup($1^\lambda$) is configured to initialize the public parameter pp of the ZKP system.

ZKP.KeyGen(pp, C) is configured to generate the key pair (pk, vk). The proof key pk is used for generating a proof, and the verification key vk is used for verifying the proof.

ZKP.Prove(pk, $\vec{x}$, R, h) is configured to generate the proof $\pi$, which proves that the calculation result R is obtained from real valid data $\vec{x}$.

ZKP.Verify(vk, $\pi$, R, h) is configured to verify the proof $\pi$ to determine the authenticity and validity of the data $\vec{x}$ and the correctness of the calculation result R.

In the case of using the same verification circuit in the ZKP system, the public parameter pp is initialized only once, and the public parameter pp is used for ZKP.KeyGen(pp, C) to generate a key pair, and calculations for proof generation and verification.

As some possible implementations, in step (1), the trusted DA selects a digital signature mechanism $\pi$=(KeyGen, Sign, Verify), which is but not limited to ECDSA and RSA.

$\pi$.KeyGen($1^\lambda$) is configured to initialize a signature algorithm to generate a signature key pair ($pk_a$, $sk_a$).

$\pi$.Sign($sk_a$, data) is configured to sign data and generate a signature $\sigma_a$.

$\pi$.Verify($pk_a$, data, $\sigma_a$) is configured to verify the signature $\sigma_a$.

As some possible implementations, a calculation task in step (1) includes:

The smart contract-based DApp constructs an arithmetic equation according to calculation requirements. The DU proves to the DApp that data provided by the DU satisfies an equation relationship.

Assuming that the calculation task required by the smart contract-based DApp is an equation h=Hash($[x_1, x_2, \ldots, x_n, r]|ID|T$), the DU proves to the smart contract-based DApp that the DU knows an original hash image corresponding to h is $x_1, x_2, \ldots, x_n$, r, ID, T, and does not leak $x_1, x_2, \ldots, x_n$ and r to the smart contract-based DApp.

The same verification circuit is used for the same calculation task, and the circuit is repeatable.

As some possible implementations, the verification circuit C is constructed in step (1) as follows.

The private input $\vec{x}$ of the DU is used as an input of the verification circuit C, and the calculation result R and the hash value h required by the DApp are used as outputs of the verification circuit C to prove that the calculation result R required by the DApp is indeed calculated from data $\vec{x}$ certified by the trusted DA as an input.

The verification circuit C includes a combination of addition, subtraction, multiplication, division, comparison, or hash calculation, and the combination form is determined according to the requirements of the smart contract-based DApp to verify private data of a user.

As some possible implementations, in the case where the ZKP system in step (2) uses the same verification circuit, the key pair (pk, vk) is initialized only once.

As some possible implementations, the key pair generation by using the public parameter pp and the verification circuit C as inputs in step (2) is implemented by a trusted third-party institution or a trusted process.

As some possible implementations, the specific steps of the DataAuth($sk_a$, $\vec{x}$) algorithm in step (3) are as follows.

The trusted DA uses an identity ID of the DU and a current time T to extend the private input $\vec{x}$ of the DU into ($\vec{x}$, ID, T).

The trusted DA performs a hash operation on the extended private input $\vec{x}$ to obtain h=Hash($x_1, x_2, \ldots, x_n r|ID|T$).

The trusted DA runs a $\pi$.Sign($sk_a$, h) algorithm based on the private key $sk_a$, and generates a signature $\sigma_a = \pi$.Sign($sk_a$, Hash($[x_1, x_2, \ldots, x_n, r]|ID|T$)) for the hash value of the extended private input $\vec{x}$.

The hash operation function Hash( ) includes, but is not limited to, SHA256 and SHA3 hash functions.

As some possible implementations, the calculation result R of step (4) is a calculation result required by the DApp. The value is calculated through the private input $\vec{x}$ of the DU in combination with a public correlation coefficient announced by the DApp.

As some possible implementations, the specific steps of the Verify(vk, $pk_a$, $\pi$, R, h, $\sigma_a$) algorithm in step (5) are as follows.

The validator V inputs the public key $pk_a$, the hash value h, and the signature $\sigma_a$ for signature verification into a signature verification algorithm $\pi$.Verify($pk_a$, h, $\sigma_a$) to verify whether the signature $\sigma_a$ of the hash value h is valid or not. If the signature $\sigma_a$ is invalid, 0 is output.

If the signature $\sigma_a$ is valid, ZKP.Verify(vk, $\pi$, R, h) of the ZKP system is continuously used to verify whether $\pi$ is correct or not. If the verifications are passed, the calculation result R is determined to be correct, otherwise the calculation result R is determined to be wrong.

The ZKP-based privacy protection method for authenticated data in a smart contract includes the following steps.

A trusted DA, a smart contract-based DU, a validator V, and a smart contract-based DApp are adopted.

The DA is an independent and trusted data source. The DA will generate reliable data and use a private key $sk_a$ to sign data of the DU. In addition, the DA knows when the data was generated and knows an owner of the data, but the DA will never disclose the data to other DUs. Each DU can use the corresponding public key $pk_a$ to verify a signature of the data.

The DU needs to take own private real data as an input to acquire decentralized services provided by the DApp. Due to privacy issues, the DU hopes to protect privacy while enjoying services.

The validator V is a blockchain maintainer (miner) for verifying a transaction submitted to a blockchain system. The validators generate new blocks including verified transactions by running a consensus algorithm. Similarly, smart contracts may be executed on the blockchain.

The DApp provides services in the form of smart contracts on the blockchain. For example, a decentralized medical insurance plan provides insurance services to individuals in the form of decentralized smart contracts.

The DU sends a service request to the DApp (smart contract), which includes a calculation result required by the DApp, a hash value privately input by the DU, a proof, and a signature. After the validator V verifies the service request, the DApp provides services to its users.

The DU takes three vectors as inputs: a first vector is a private data vector $\vec{x}=(x_1, x_2, \ldots, x_n, r)$ of the DU, a second vector is a public parameter vector $\vec{c}=(c_1, c_2, \ldots, c_h)$, which is used for calculating the calculation result R required by the DApp, and a third vector is auxiliary data $\vec{a}=(ID, T)$, where ID, T and r are an identity of the DU, time information and a random number, and the random number r is used for confusing the input of the DU.

Further, the DU uses three vectors ($\vec{x}$, $\vec{c}$, $\vec{a}$) as the input of the verification circuit for authenticated data privacy protection, and uses the calculation result R and the hash value h as the output of the verification circuit for authenticated data privacy protection. The calculation result R is necessary for the DApp to perform certain operations, and the hash value h is used for verifying the authenticity of $\vec{x}$.

Further, the ZKP system generates a ZKP $\pi$ for the verification circuit for authenticated data privacy protection. The DU sends the following variables to the DApp to verify the correctness of the calculation result: proof $\pi$, vectors $\vec{c}$ and $\vec{a}$, calculation result R, hash value h, and digital signature $\sigma_a$ on h. The DApp verifies that R is indeed the result of the calculation of $\vec{x}$ and $\vec{c}$, and the hash value h is indeed calculated through $\vec{x}$ and $\vec{a}$ to ensure that the same $\vec{x}$ is used to generate R and h. The DApp checks the validity of the signature $\sigma_a$ to ensure the authenticity of $\vec{x}$.

The ZKP-based privacy protection method for authenticated data in a smart contract consists of five steps, which are described in detail as follows:

A. System setting: A security parameter $\lambda$ is input, and a public parameter pp is obtained using ZKP.Setup($1^\lambda$) of a ZKP system. The DA selects a secure digital signature mechanism $\pi$=(KeyGen, Sign, Verify) to generate a public/ private key pair ($pk_a$, $sk_a$). The DA announces (pp, $pk_a$). The DA constructs a verification circuit C according to a calculation task required by the DApp.

Further, ZKP=(Setup, KeyGen, Prove, Verify) is but not limited to zk-SNARKs, zk-STARKs, and Bulletproofs. ZKP.Setup($1^\lambda$) is configured to initialize the public parameter pp of the ZKP system. ZKP.KeyGen(pp, C) is configured to generate the proof key pair (pk, vk). The proof key pk is used for generating a proof, and the verification key vk is used for verifying the proof. ZKP.Prove(pk, $\vec{x}$, $\vec{c}$, $\vec{a}$, R, h) is configured to generate the proof π, which proves that the calculation result R is obtained from real valid data $\vec{x}$. ZKP.Verify(vk, π, $\vec{c}$, $\vec{a}$, R, h) is configured to verify the proof it to determine the authenticity and validity of the data $\vec{x}$ and the correctness of the calculation result R. In the case of using the same verification circuit in the ZKP system, the public parameter pp is initialized only once, and the public parameter pp is used for ZKP.KeyGen(pp, C) to generate a key pair, and calculations for proof generation and verification.

Further, a digital signature mechanism π=(KeyGen, Sign, Verify) selected by the DA is but not limited to ECDSA and RSA. π.KeyGen($1^\lambda$) is configured to initialize a signature algorithm to generate a signature key pair ($pk_a$, $sk_a$). π.Sign($sk_a$, data) is configured to sign data and generate a signature $\sigma_a$. π.Verify($pk_a$, data, $\sigma^a$) is configured to verify the signature $\sigma_a$.

Further, the DApp constructs a circuit according to private data verification requirements. The DU proves to the smart contract-based DApp that private data provided by the DU satisfies a verification circuit relationship. Assuming that the verification condition required by the smart contract-based DApp is an equation h=Hash([$x_1$, $x_2$, . . . , $x_n$, r]|ID|T), the DU proves to the smart contract-based DApp that the DU knows an original hash image corresponding to h is $x_1$, $x_2$, . . . , $x_n$, r, ID, T, and does not leak $x_1$, $x_2$, . . . , $x_n$ and r to the smart contract-based DApp. The same verification circuit is used for the same calculation task, and the verification circuit is repeatable.

Figure 2:
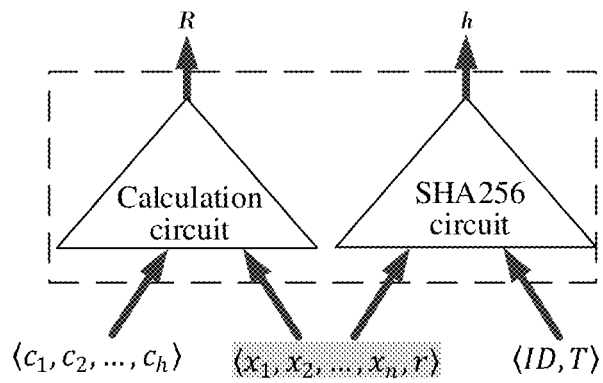
FIG. 2 is a schematic structural diagram of a basic verification circuit for authenticated data privacy protection in Embodiment 1.

Further, the verification circuit C uses the private input $\vec{x}$, the public parameter vector $\vec{c}$ and auxiliary data $\vec{a}$ of the DU as verification circuit inputs, and uses the calculation result R and the hash value h required by the smart contract-based DApp as verification circuit outputs to prove that the calculation result R required by the smart contract-based DApp is indeed calculated from the data $\vec{x}$ and the public parameter vector $\vec{c}$ certified by the trusted DA as inputs, as shown in FIG. 2; the verification circuit C may perform a combination of addition, subtraction, multiplication, division, comparison, and hash, etc., to implement a more complex verification circuit.

B. Key generation: A trusted third party runs a ZKP.KeyGen(pp, C) algorithm of the ZKP system by using the public parameter pp and the verification circuit C as inputs to generate the key pair (pk, vk). The proof key pk is used for generating a proof, and the verification key vk is used for verifying the proof.

Further, the ZKP system may be, but is not limited to, zk-SNARKs, zk-STARKs, and Bulletproofs. In the case of using the same verification circuit in the ZKP system, the public parameter pp and the key pair (pk, vk) are initialized only once.

C. Data generation and authentication: According to the requirements of the DApp, the DU makes a request to the DA to obtain its personal data $\vec{x}$. The trusted DA runs a DataAuth($sk_a$, $\vec{x}$) algorithm by using private data $\vec{x}$ and a signature private key $sk_a$ as inputs, performs authentication on the data, and generates a signature $\sigma_a$. According to the DataAuth algorithm, the DA will verify the authenticity of $\vec{x}$ and associate $\vec{x}$ with an ID of the DU.

Further, the specific steps of the DataAuth($sk_a$, $\vec{x}$) algorithm are as follows. The DA uses the identity ID of the DU and a current time T to extend the private input $\vec{x}$ of the DU. The DA performs a hash operation on the extended private input $\vec{x}$ to obtain h=Hash($x_1$, $x_2$, . . . , $x_n$, r|ID|T). The DA runs a π.Sign($sk_a$, h) algorithm based on the private key $sk_a$, and generates a signature $\sigma_a$=π.Sign($sk_a$, Hash([$x_1$, $x_2$, . . . , $x_n$, r]|ID|T)) for the hash value of the extended private input $\vec{x}$. The hash operation function Hash( ) may be, but is not limited to, SHA256 and SHA3 hash functions.

D. DApp service request: The DU checks DApp rules and acquires a public input $\vec{c}$ from the DApp. The DU acquires its private data $\vec{x}$ (extended by r) and an auxiliary input $\vec{a}$=(ID, T), as well as the calculation result R and the hash value h required by the DApp. The DU executes a ZKP.Prove(pk, $\vec{x}$, $\vec{c}$, $\vec{a}$, R, h) algorithm of the ZKP system to obtain a proof π. The DU sends a service request containing (π, R, h, $\sigma_a$) to the DApp. The request will be sent to a blockchain in the form of a transaction (Tx) of a DApp address.

Further, the calculation result R is a calculation result required by the DApp. The value is calculated through the private input $\vec{x}$ of the DU in combination with a public correlation coefficient $\vec{c}$ announced by the DApp.

E. DApp service response: After receiving the service request, each validator V runs a corresponding function of a DApp smart contract, which calls the Verify(vk, $pk_a$, π, $\vec{c}$, $\vec{a}$, R, h, $\sigma_a$) algorithm. If the output of a verification function is 0, the validator V will discard the transaction. If the output of the verification function is 1, the validator V uses the calculation result R to execute the DApp. The execution of the DApp relies on the consensus of the validators, so only when most validators accept the proof, it can be proved that the proof verified by the DApp is valid.

Further, the specific steps of the Verify(vk, $pk_a$, π, $\vec{c}$, $\vec{a}$, R, h$\sigma_a$) algorithm are as follows. The validator V inputs the public key $pk_a$, the hash value h, and the signature $\sigma_a$ for signature verification into a signature verification algorithm π.Verify($pk_a$, h, $\sigma_a$) to verify whether the signature $\sigma_a$ of the hash value h is valid or not. If the signature $\sigma_a$ is invalid, 0 is output. If the signature $\sigma_a$ is valid, ZKP.Verify(vk, π, $\vec{c}$, $\vec{a}$, R, h) of the ZKP system is continuously used to verify whether π is correct or not. If the verifications are passed, the calculation result R is determined to be correct, otherwise the calculation result R is determined to be wrong.

Further, any DApp with a fixed verification circuit may be executed using the above-mentioned process based on a ZKP technology to protect the privacy of the DU. Theoretically, DApps with limited cycles may also be implemented. A complex calculation verification circuit will increase the cost of a prover (that is, DU). According to the ZKP technology, no matter how complex the DApp calculation function is, the calculation cost of the validator is fixed.

Further, because the verification circuit takes the calculation result R as an output, and is open to every user. In order to hide the plaintext output R, a similar ZKP algorithm may be used to generate a proof for R without publishing R. Meanwhile, the DU may also pay R amount as premium to protect the output and payment privacy. The DA may construct the corresponding verification circuit shown in FIG. 4. The DU uses a ZKP.Prove( ) algorithm to generate a corresponding verification circuit proof. It is to be noted that the output of a calculation circuit will be used as the input of a payment circuit, so the output of the calculation circuit is hidden from other outputs.

Further, in order to prevent malicious DUs from using other people's data as their own data, a secure credential scheme should be used to generate the ID of the DU to distinguish the DU. The ID of the DU may be used as a private input for two SHA256 circuits, as shown in the circuit in FIG. 5. The first SHA256 circuit outputs h, which matches the previous proof of insurance payment. The second SHA256 circuit outputs h', and h' must be signed by an insurance claim DA.

Further, a system framework of the ZKP-based privacy protection method for authenticated data in a smart contract may be implemented by a combination of three modules, including a smart contract-based DApp, a ZKP module and a blockchain system. The ZKP module may be, but is not limited to, zk-SNARKs, zk-STARKs and Bulletproofs. The DApp is a smart contract run on a blockchain. The blockchain may be, but is not limited to, Ethereum.

Figure 3:
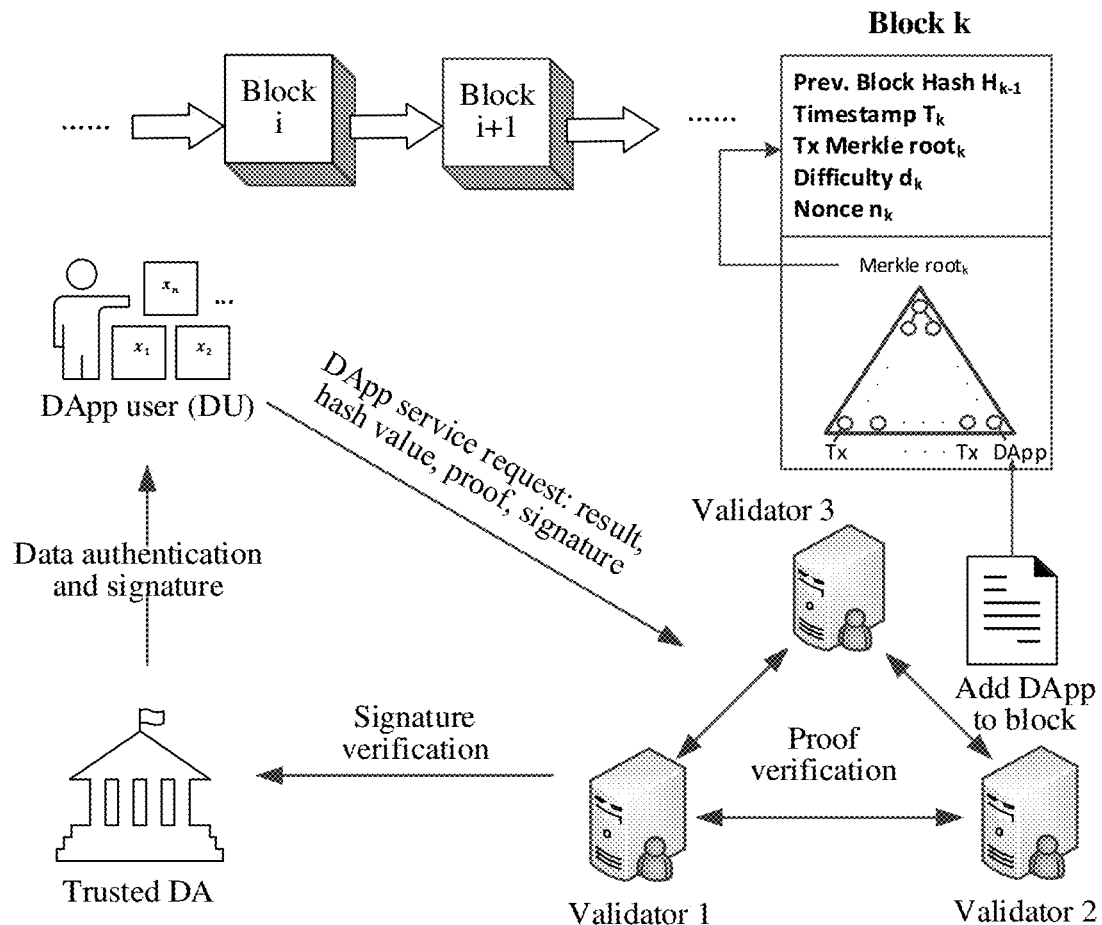
FIG. 3 is a schematic diagram of a system framework of a ZKP-based privacy protection method for authenticated data in a smart contract in Embodiment 1.
Figure 6:
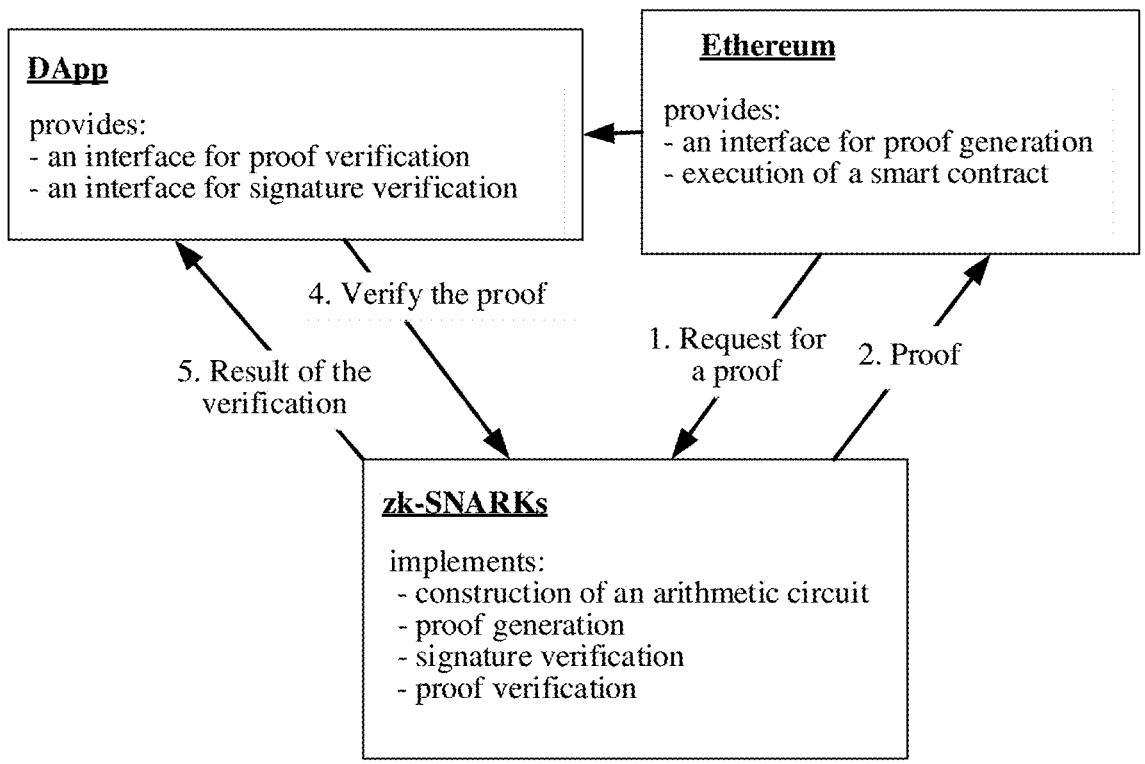
FIG. 6 is a schematic diagram of a system framework implemented by taking Ethereum and zk-SNARKs as an example in Embodiment 1.

In order to explain the present disclosure more clearly, a specific example is a medical insurance plan, which requires medical reports certified by a hospital to register. A smart contract-based DU is a person who wants to sign the plan, a DA is a trusted hospital, a validator V is a blockchain maintainer, and a DApp is a decentralized medical insurance smart contract, as shown in FIG. 3. A privacy protection scheme for authenticated data in a medical insurance smart contract where Ethereum and zk-SNARKs are taken as an example is shown in FIG. 6. The following is an explanation through the specific example:

A. System setting: A security parameter $\lambda=80$ is input, and zk-SNARKs.Setup($1^\lambda$) is run to obtain a public parameter pp. ECDSA is selected as a selected secure digital signature mechanism. In addition, a DA has a public/private key pair $(pk_a, sk_a)$=(0x6044c69f . . . , {0x225bf5a8 . . . , 0x5f18 . . . , . . . }) of the signature mechanism. A DU obtains a unique ID=0x957a . . . =(149, 122, . . . ) from the DA.

Figure 4:
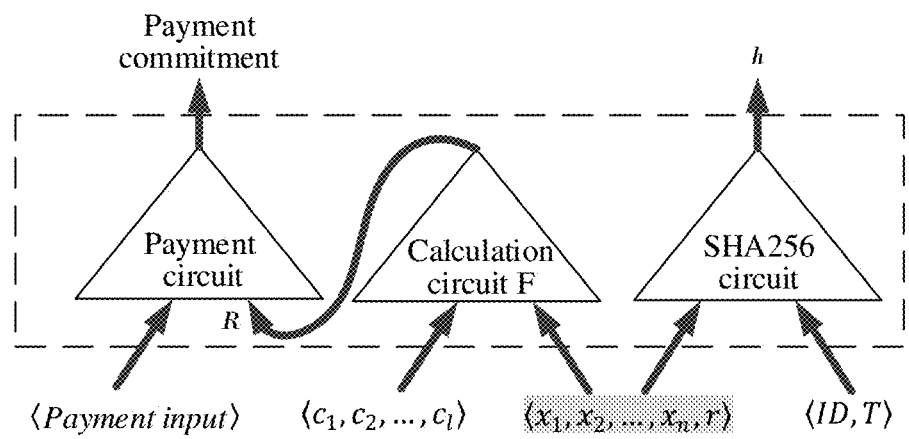
FIG. 4 is a schematic structural diagram of a verification circuit for authenticated data privacy protection for protecting a plaintext output in Embodiment 1.
Figure 5:
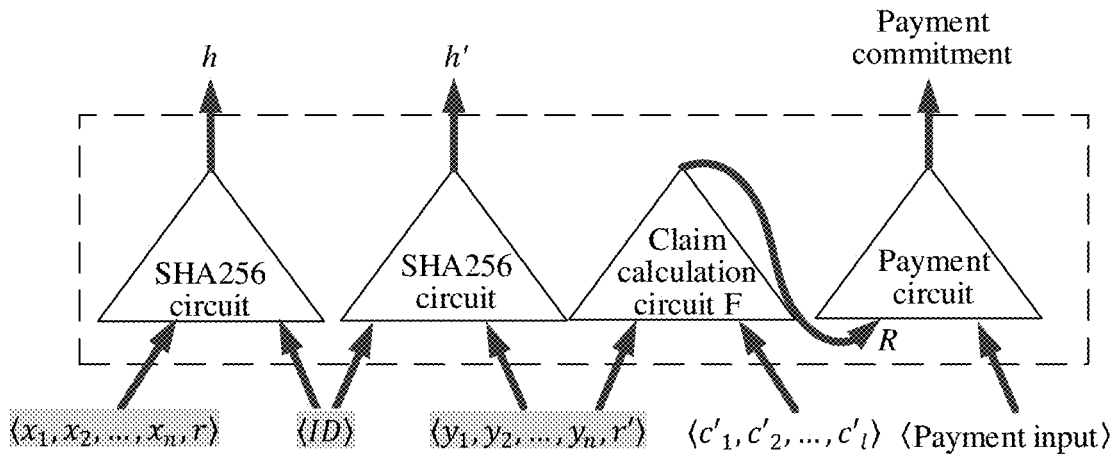
FIG. 5 is a schematic structural diagram of a verification circuit for authenticated data privacy protection for preventing malicious user fraud in Embodiment 1.

B. Key generation: A verification circuit C is constructed according to a calculation task required by a DApp, as shown in FIG. 2, FIG. 4 or FIG. 5. A trusted third party runs a zk-SNARKs.KeyGen(pp, C) algorithm by using the public parameter pp and the verification circuit C as inputs, and outputs a proof key for proof generation pk={{0x1c4d . . . , 0x453c . . . ), (0x2ab2 . . . , 0x4710 . . . ), . . . }, {(0x42ae . . . , 0x637b . . . ), (0x9285 . . . , 0x2b4c . . . ), . . . }, {(0xc021 . . . , 0x375f . . . ), (0x753c . . . , 0x538a . . . ), . . . }, {(0x412a . . . , 0x3409 . . . ), (0x832b . . . , 0x4096 . . . ), . . . }, {(0x2ef1 . . . , 0xab37 . . . ), (0x3cd6 . . . , 0x232c . . . ), . . . }}, and a verification key for proof verification vk={(0x973c . . . , 0x2f99 . . . ), (0x6fed . . . , 0x2bd3 . . . ), (0xca7a . . . , 0x205a . . . ), (0xf24f . . . , 0x1c81 . . . ), (0x20c7 . . . , 0x2553 . . . ), (0x2bf8 . . . , 0x1cae . . . ), (0xbaaa . . . , 0x1086 . . . ), {(0xd445 . . . , 0x3030 . . . ), (0x10ab . . . , 0x1c7e . . . ), . . . }}.

C. Data generation and authentication: According to the requirements of the smart contract-based DApp, assuming the form of personal data is (age, height, weight, blood pressure, heart rate, vital capacity, and random number), the DU will package own personal data and make a request to the DA to obtain its personal data $\vec{x}$=(36, 177, 65, 105, 70, 75, 14, 216, 140, 180, 141, 27, . . . ), where the private data of the DU is: 36 years old, height 177 cm, weight 65 kg, blood pressure (105 mmHg, 70 mmHg), heart rate 75 beats, vital capacity 3800 ml=(14,216), and random number r=0x8cb48d1b . . . =(140, 180, 141, 27, . . . ). In addition, an identity ID of the DU=0x957a . . . =(149, 122, . . . ) and a current time T=20180901=(1, 51, 239, 165). The DA runs a DataAuth($sk_a$, $\vec{x}$) algorithm to generate a signature $\sigma_a$=0x96f3ba163366bfac687b . . . , which is applied to hash values of $\vec{x}$, the identity ID of the DU and the current time T. According to the DataAuth algorithm, the DA will verify the authenticity of $\vec{x}$ and associate $\vec{x}$ with the ID of the DU.

D. DApp service request: The DU checks DApp rules and acquires a public input $\vec{c}$=(10, 2, 7, 8, 9, . . . ) from the DApp. The DU acquires its private data $\vec{x}$ (extended by r=(140, 180, 141, 27, . . . )) and an auxiliary input $\vec{a}$=(ID, T)={(149, 122, . . . , 1, 51, 239, 165)}, as well as a calculation result R=3244=10×36+2×177+7×65+8×(105+70)+9×70 and a hash value h=0xeffd0b7f . . . =SHA256($\vec{x}$|r| $\vec{a}$) required by the DApp. The DU executes a zk-SNARKs.Prove(pk, $\vec{x}$, $\vec{c}$, $\vec{a}$, R, h) algorithm to obtain a proof $\pi$={(2057 . . . , 2644 . . . ), (3920 . . . , 1382 . . . ), (1519 . . . , 8915 . . . ), (9716 . . . , 1262 . . . ), (1832 . . . , 1834 . . . ), (1917 . . . , 1050 . . . ), (2052 . . . , 1082 . . . ), (1840 . . . , 5570 . . . )}. The DU sends a service request including ($\pi$, R, h, $\sigma_z$) to the DApp. The request will be sent to a blockchain in the form of a transaction (Tx) of a DApp address.

E. DApp service response: After receiving the service request, each validator V runs a corresponding function of a DApp smart contract, which calls the Verify(vk, $pk_a$, $\pi$, $\vec{c}$, $\vec{a}$, R, h, $\sigma_a$) algorithm. If the output of a verification function is 1, the validator V executes the DApp with the calculation result R=3244, deducts an equivalent amount through a payment circuit, as shown in FIG. 4, and provides corresponding insurance plan services for the DU.

After the DU registers for DApp medical insurance and pays the premium, if a claim settlement occurs later, the DU needs to prove its identity to pursue a claim. A compensation amount R will be output through a claim calculation circuit, and will be paid to the DU through the payment circuit, as shown in FIG. 5.

In Embodiment 2, a ZKP-based privacy protection system for authenticated data in a smart contract is provided.

The ZKP-based privacy protection system for authenticated data in a smart contract includes:

- an initialization module, configured to perform initialization, input a security parameter to obtain a public parameter, and generate a public/private key pair by a trusted DA;
- a key pair generation module, configured to generate a key pair by using the public parameter and a verification circuit as inputs; and the key pair includes a proof key and a verification key;

a data authentication module, configured to perform authentication on private data of a DU by using the private key of the trusted DA, and generate a signature;

a proof generation module, configured to input, by a DU prover terminal, the private data serving as an input value and a calculation result and a hash value serving as output values of the verification circuit, and generate, by the DU, a ZKP using the proof key; and a proof verification module, configured to verify, by a validator by using the verification key, whether the ZKP is correct or not; if the verification is passed, it is determined that the calculation result is correct, otherwise it is determined that the calculation result is wrong, and execute, by the validator, a smart contract based on a result of the verification.

In Embodiment 3, the present embodiment also provides an electronic device, which includes a memory, a processor, and computer instructions stored on the memory and executable by the processor. When run by the processor, the computer instructions implement the steps of the method in Embodiment 1.

In Embodiment 4, the present embodiment also provides a computer-readable storage medium for storing computer instructions. When run by a processor, the computer instructions implement the steps of the method in Embodiment 1.

The foregoing descriptions are merely preferred embodiments of this application, but are not intended to limit this application. This application may include various modifications and changes for a person skilled in the art. Any modification, equivalent replacement, or improvement made within the spirit and principle of this application shall fall within the protection scope of this application.

What is claimed is:

1. A Zero Knowledge Proof (ZKP)-based privacy protection method for authenticated data in a smart contract, the method comprising:

inputting a security parameter to obtain a public parameter using a zero-knowledge proof algorithm, and generating, by a trusted Data Authenticator (DA), a public/private key pair;

generating a key pair by using the public parameter and a verification circuit as inputs, the key pair including a proof key and a verification key;

performing authentication on private data of a Decentralized App (DApp) User (DU) by using the private key of the trusted DA, and generating a signature;

inputting, by a DU prover terminal, the private data serving as an input value and a calculation result and a hash value serving as output values of the verification circuit, and generating, by the DU, a ZKP using the proof key; and verifying, by a validator by using the verification key, whether the ZKP is correct or not, and determining that the calculation result is correct when the verification is passed, or determining that the calculation result is wrong when the verification fails, and executing, by the validator, a smart contract based on a result of the verification.

2. The method of claim 1, wherein the inputting the security parameter to obtain the public parameter is performed by inputting the security parameter to obtain the public parameter using a ZKP system.

3. The method of claim 1, wherein the generating, by the trusted DA, the public/private key pair is performed by selecting, by the trusted DA, a digital signature mechanism to generate the public/private key pair, and announcing, by the trusted DA, the public key.

4. The method of claim 1, wherein a plurality of trusted DAs are allowed, such that private data of a user is authenticated and signed by different DAs.

5. The method of claim 1, wherein the generating the key pair by using the public parameter and the verification circuit as inputs is performed by:

executing a ZKP system by using the public parameter and the verification circuit as inputs to generate the key pair.

6. The method of claim 1, wherein a ZKP system is executed to generate the key pair, the key pair being allowed to be generated jointly by a plurality of trusted institutions or generated by a trusted process.

7. The method of claim 1, wherein the generating, by the DU, of a proof is performed by executing, by the DU, a ZKP system to generate the proof.

8. A Zero Knowledge Proof (ZKP)-based privacy protection system for authenticated data in a smart contract, the system comprising:

one or more computer processors programmed to function as:

an initialization module, stored in a memory, configured to perform initialization including inputting a security parameter to obtain a public parameter using a zero-knowledge proof algorithm, and generating a public/private key pair by a trusted Data Authenticator (DA);

a key pair generation module, stored in the memory, configured to generate a key pair by using the public parameter and a verification circuit as inputs, the key pair including a proof key and a verification key;

a data authentication module, stored in the memory, configured to perform authentication on private data of a Decentralized App (DApp) User (DU) by using the private key of the trusted DA, and generate a signature;

a proof generation module, stored in the memory, configured to input, by a DU prover terminal, the private data serving as an input value and a calculation result and a hash value serving as output values of the verification circuit, and generate, by the DU, a ZKP using the proof key; and a proof verification module, stored in the memory, configured to verify, by a validator by using the verification key, whether the ZKP is correct or not, and determine that the calculation result is correct when the verification is passed, or determine that the calculation result is wrong when the verification fails, and execute, by the validator, a smart contract based on a result of the verification.

* * * * *